(12) United States Patent
Sugiyama et al.

(10) Patent No.: US 7,290,837 B2
(45) Date of Patent: Nov. 6, 2007

(54) CUSHION PLATE FOR VEHICLE SEAT

(75) Inventors: Shinji Sugiyama, Tochigi-ken (JP); Yutaka Kizawa, Tochigi-ken (JP)

(73) Assignee: TS Tech Co., Ltd., Saitama-Ken (JP)

( * ) Notice: Subject to any disclaimer, the term of this patent is extended or adjusted under 35 U.S.C. 154(b) by 0 days.

(21) Appl. No.: 11/259,361

(22) Filed: Oct. 27, 2005

(65) Prior Publication Data
US 2006/0232114 A1    Oct. 19, 2006

(51) Int. Cl.
*B60N 2/68* (2006.01)
(52) U.S. Cl. ............... 297/452.55; 297/284.4; 297/452.31; 297/452.33
(58) Field of Classification Search ............ 297/284.1, 297/452.31, 452.33, 452.36, 452.55, 284.4
See application file for complete search history.

(56) References Cited

U.S. PATENT DOCUMENTS

| | | | | |
|---|---|---|---|---|
| 4,883,320 A | * | 11/1989 | Izumida et al. ........ | 297/452.56 |
| 5,044,693 A | * | 9/1991 | Yokota ................... | 297/452.18 |
| 5,101,811 A | * | 4/1992 | Brunswick ............... | 297/284.4 |
| 5,129,707 A | * | 7/1992 | Yamauchi ............... | 297/216.14 |
| 5,551,752 A | * | 9/1996 | Lovegrove et al. ...... | 297/284.5 |
| 5,649,739 A | * | 7/1997 | Zapf ....................... | 297/301.1 |
| 6,957,596 B2 | * | 10/2005 | Kopetzky et al. ........ | 297/284.4 |
| 2004/0080197 A1 | * | 4/2004 | Kopetzky ................ | 297/284.4 |
| 2005/0104428 A1 | * | 5/2005 | Walker et al. ........... | 297/284.4 |

* cited by examiner

*Primary Examiner*—Peter R. Brown
(74) *Attorney, Agent, or Firm*—Browdy and Neimark, PLLC

(57) ABSTRACT

A vehicle seat includes a seat back frame of a rectangular shape having a pair of side frames, upper and lower seat springs mounted between the side frames, and a flexible cushion plate in the form of a single plate attached to the seat springs. The cushion plate has a lower wide section supporting the vicinity of ilia (S) of a seated occupant (P), and a narrow middle section for reducing hold performance for the vicinity of a waist of the seated occupant (P). The cushion plate has an upper edge projecting slightly higher than a ninth dorsal vertebra (R) of the seated occupant (P).

3 Claims, 3 Drawing Sheets

CUSHION PLATE FOR VEHICLE SEAT

FIELD OF THE INVENTION

The present invention relates to a cushion plate for a vehicle seat, and more particularly to a cushion plate made of a synthetic resin for elastically supporting a seat back cushion.

DESCRIPTION OF THE PRIOR ART

Seat back cushions for conventional vehicle seats are elastically supported by many seat springs mounted between two side frames of a seat back frame. The typical seat spring generally comprises zigzag spring or formed wire spring.

The degree of distortion of the seat springs varies among the positions of the springs according to the magnitudes of loads applied thereto. The spring to be disposed in the upper part or the lower part of the seat back frame is subject to greater distortion than a spring disposed in the middle of the seat back frame. Even in one spring, the middle is subject to greater distortion than its left and right parts. Thus, the degree of distortion of the springs differs from position to position. This degrades the stability and comfort of a seat on which one is seated.

SUMMARY OF THE INVENTION

Therefore, it is an object of the present invention to provide a vehicle seat which has overcome the above-described problems by elastically supporting a seat back cushion by a cushion plate made of a synthetic resin.

DESCRIPTION OF THE PREFERRED EMBODIMENT

Figure 1:
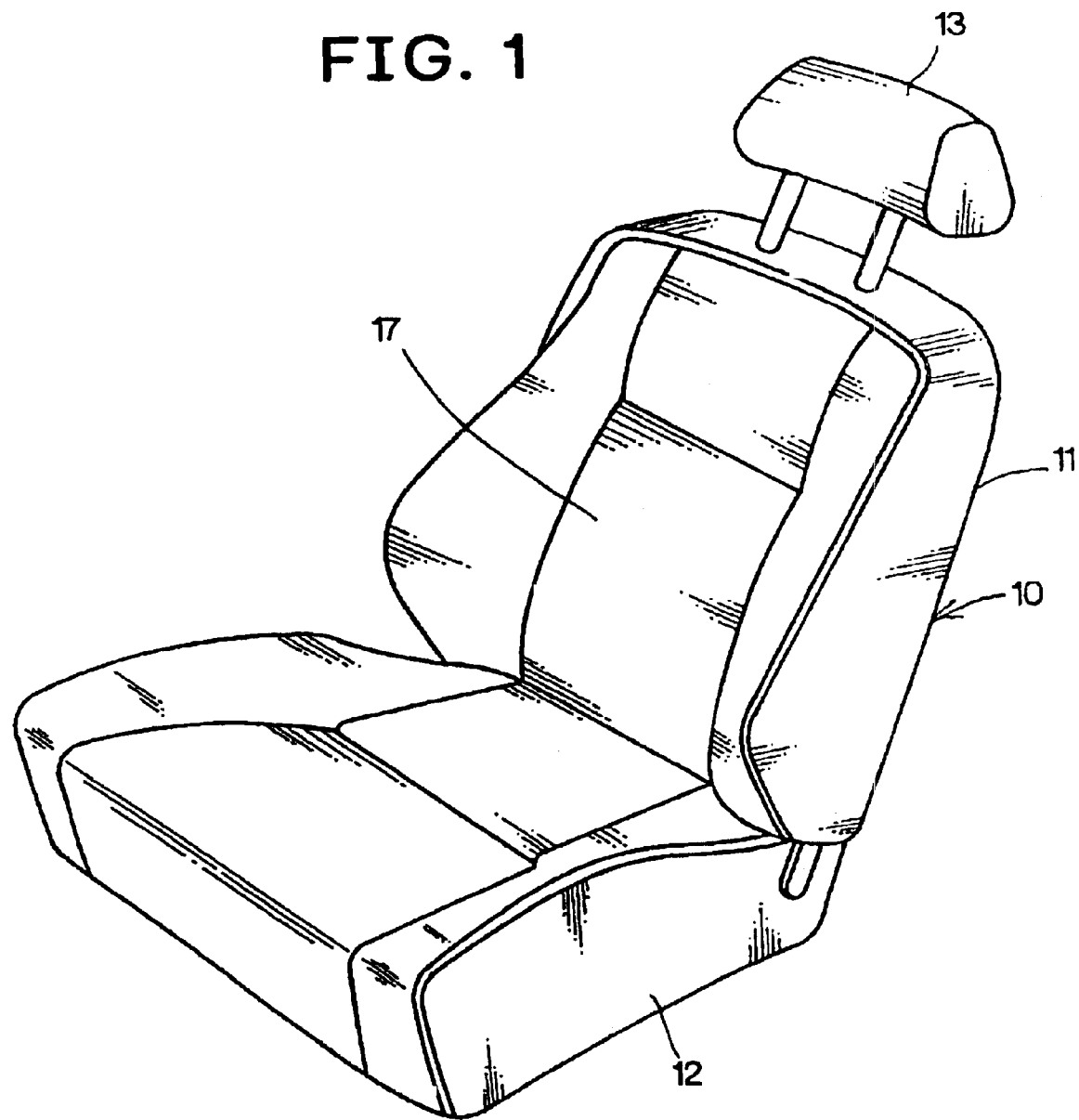
FIG. 1 is a perspective view showing a vehicle seat according to the present invention.
Figure 2:
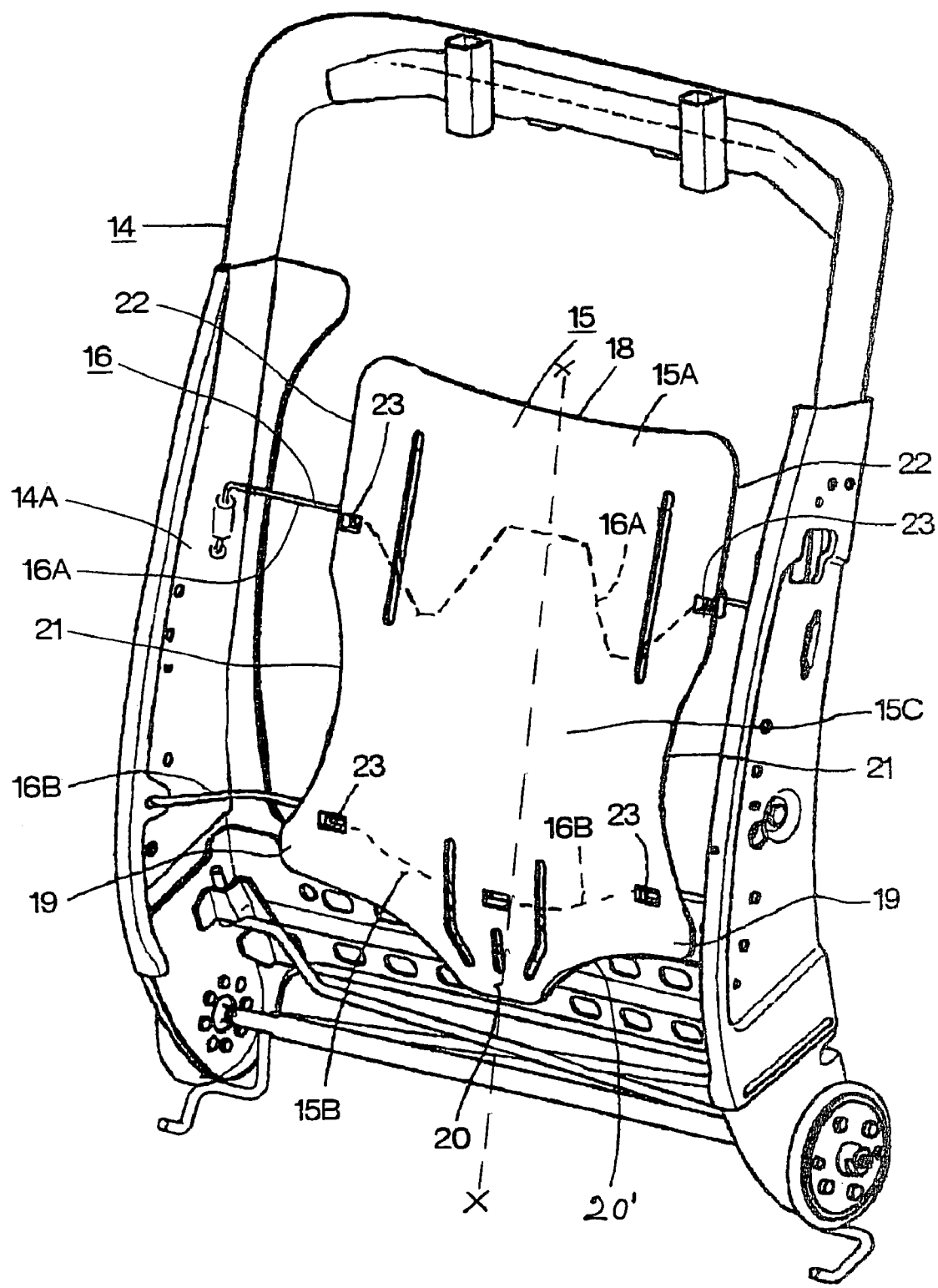
FIG. 2 is a perspective view showing a seat back frame and a cushion plate of the vehicle seat.

One embodiment of the present invention will be described referring to the accompanying drawings. A vehicle seat 10 according to the present invention includes a seat back 11, a seat bottom 12, and a headrest 13 attached to an upper portion of the seat back 11.

The seat back 11 has a seat back frame 14 of a rectangular or approximately rectangular shape. A flexible cushion plate 15 is disposed inside the back frame 14. The plate 15 is preferably formed from a synthetic resin such as polypropylene, and is a single plate of a rectangular or approximately rectangular shape. The plate 15 is attached to seat springs 16, such as zigzag springs or formed wire springs. The seat springs 16 include at least an upper seat spring 16A and a lower seat spring 16B. Each spring 16 is pulled substantially sideways, and both ends thereof are connected to side frames 14A of the seat back frame 14. A cushion 17 is disposed over the front of the cushion plate 15.

When subject to the load of a seated occupant P, the cushion plate 15 is deformed and moved backward against the elasticity of the springs 16 so as to flexibly support the seated occupant P. The plate 15 supports the cushion 17 on its face. Accordingly, this imparts greater comfort to the seated occupant P than a conventional structure in which the cushion 17 is supported only by the seat springs 16.

The cushion plate 15 has an upper wide section 15A, a lower wide section 15B, and a narrow middle section 15C defined between the upper section 15A and the lower section 15B.

Figure 3:
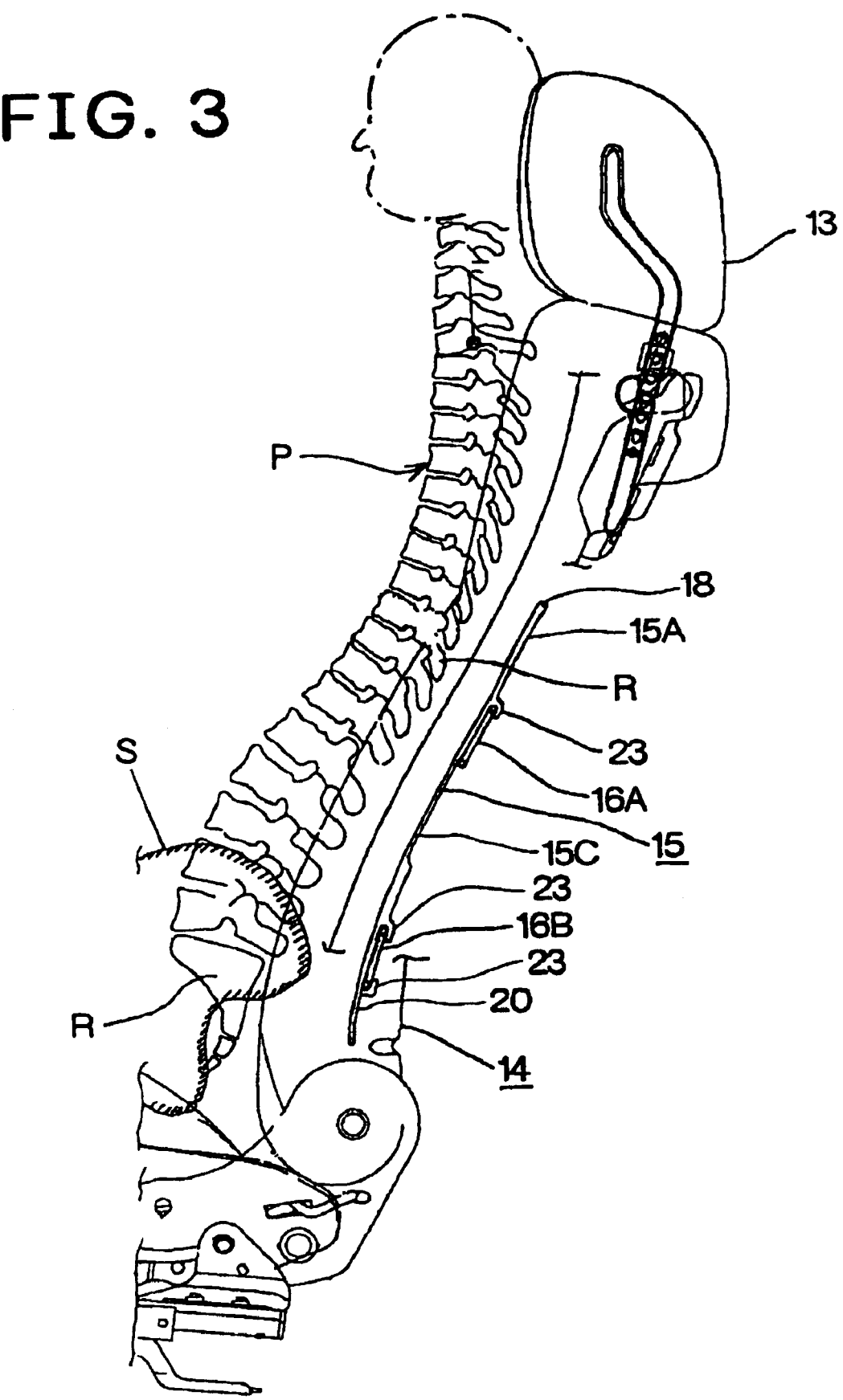
FIG. 3 is a side view showing the relation between a bone structure of an occupant and the cushion plate.

The upper section 15A has an upper edge 18 of a gently arcuate shape curving downward in the middle. As shown in FIG. 3, the upper edge 18 is situated slightly higher than a ninth dorsal vertebra R of the seated occupant P who has an average height. The center of gravity of the upper half of the body of the seated occupant P is situated in the vicinity of the ninth dorsal vertebra R. In a seated position, the vicinity of the ninth dorsal vertebra R moves least in the whole of the upper half of the body. Positioning the upper edge 18 of the cushion plate 15 higher than the ninth dorsal vertebra R enables the cushion plate 15 to cushion the movement of many parts of the upper half of the body. Accordingly, the cushion plate 15 effectively supports the upper half of the body.

The upper seat spring 16A is disposed substantially at the same height as the ninth dorsal vertebra R. In FIG. 3, the upper spring 16A is situated slightly lower than the ninth dorsal vertebra R. This is because the load of the upper half of the body applied to the cushion 17 usually acts backward and downward. Therefore, the height of the spring 16A corresponds functionally to that of the ninth dorsal vertebra R.

The lower wise section 15B has sideways projections 19, 19 supporting the vicinity of ilia S, S which forms the upper part of a pelvis. Formed in the lower part of the lower section 15B is projection 20 having concave side edges 20' tapering downward along the longitudinal axis X-X of the cushion plate from a lower edge of the cushion plate so as to support the vicinity of sacra T of the pelvis. The sideways projections 19 and the downward projection 20 enhance hold performance for the vicinity of the hips of the seated occupant P. The downward projection 20 is situated between left and right musculi glutei of the seated occupant P and does not press the musculi glutei.

The narrow middle section 15C has inward curved edges 21, 21. The inward curved edges 21, 21 reduce hold performance for the vicinity of the waist of the seated occupant P. As long as the lower section 15B sufficiently holds the vicinity of the hips of the seated occupant P, the necessity for holding the vicinity of the waist of the seated occupant P will be less. If the waist of the seated occupant P is firmly held, the seated occupant P may soon experience tiredness and backache. Waist sizes vary greatly from seated occupant P to seated occupant P, so it is preferable that the narrow section 15C be defined between the upper section 15A and the lower section 15B.

The upper side edges 22, 22 of the cushion plate 15 extend vertically.

The lower seat spring 16B is disposed in the vicinity of the boundary of the lower section 15B and the middle section 15C. This enables the lower spring 16B to effectively support the load of the hips of the seated occupant P.

The cushion plate 15 has two hooks 23 for each spring 16.

The cushion plate 15 according to the present invention imparts stability and comfort to the occupant P seated on the above-described seat, so that the seated occupant P is less likely to feel tiredness or back pain. An explanation for this will now be given.

Since the cushion plate 15 supports the cushion 17 on its face, deformation of the cushion plate 15 is entirely uniform. Accordingly, this distributes the movement of the seated occupant P entirely uniformly, with the result that the occupant P seated on the seat feels stable and comfortable.

The gently arcuate upper edge 18 of the cushion plate 15, the middle of which curves downward, supports the shoulders of the seated occupant P without pressuring his or her upper spine. Accordingly, the occupant P seated on the above-described seat feels stable and comfortable, and so the seated occupant P is less likely to feel tired.

The upper edge 18 of the cushion plate 15 is situated slightly higher than the ninth dorsal vertebra R, which is almost the position of the center of gravity of the upper half of the body of the seated occupant P. Accordingly, the cushion plate 15 efficiently supports the loads of the many parts of the upper half of the body without pressuring the upper spine of the seated occupant P, thereby making the seated position of the seated occupant stable.

The upper seat spring 16A is situated substantially at the same height as the ninth dorsal vertebra R (i.e., the center of gravity of the upper half of the body). This enables the upper seat spring 16A to effectively support the load of the seated occupant P.

The narrow middle section 15C of the cushion plate 15 has the inward curved parts 21 that reduce hold performance for the vicinity of the waist of the seated occupant P. Therefore, the seated occupant P is less likely to feel tiredness or back pain.

The lower wide section 15B of the cushion plate 15 has the sideways projections 19 supporting the vicinity of the ilia S, and the downward projection 20 supporting the vicinity of the sacra T. This enhances hold performance for the vicinity of the hips of the seated occupant P, and compensates for the low hold performance of the narrow section 15C. In addition, the downward projection 20 between the left and right musculi glutei of the seated occupant P does not pressure the glutei. This makes the seated occupant P less likely to feel tired.

The lower seat spring 16B is situated in the vicinity of the boundary of the lower section 15B and the middle section 15C. Thus, the lower spring 16B effectively supports the load of the hips of the seated occupant P.

What is claimed is:

1. A vehicle seat having a seat back engaged over a seat bottom comprising:
    a seat back frame of a rectangular shape fixed within the seat back having a pair of side frames;
    upper and lower seat springs engaged on the side frames;
    a flexible cushion plate extending up from the bottom seat above a mid section of the seat back frame formed in a single plate attached to the upper and lower seat springs; and
    a seat back cushion supported by the cushion plate;
    wherein the cushion plate has an upper edge and a lower section wider than the upper edge along the width of the seat bottom;
    wherein the lower section has a projection having concave side edges tapering downward along the longitudinal axis of the cushion plate from a lower edge of the cushion plate so that the projection is situated midway between the side frames;
    wherein the upper edge has a gentle arcuate shape curving downward in the middle, and
    wherein the cushion plate has a middle section narrower than either the upper edge or the lower edge.

2. The vehicle seat according to claim 1, wherein the upper seat springs are engaged to the cushion plate at a height above that of the middle section.

3. The vehicle seat according to claim 1, wherein the lower seat springs are engaged to the cushion plate at the junction of the middle section and the lower section.

* * * * *